United States Patent [19]

Theimer et al.

[11] 4,099,454

[45] * Jul. 11, 1978

[54] ELECTRICAL RESISTANCE COOKING APPLIANCE FOR USE WITH AN ELECTRODE TYPE COOKING PACKAGE

[75] Inventors: Ernst Theodore Theimer, Rumson; Robert Stuart Bissett, Tinton Falls, both of N.J.

[73] Assignee: Lectrofood, Corp., East Brunswick, N.J.

[ * ] Notice: The portion of the term of this patent subsequent to Jun. 29, 1993, has been disclaimed.

[21] Appl. No.: 747,309

[22] Filed: Dec. 3, 1976

[51] Int. Cl.² .............................................. A47J 36/30

[52] U.S. Cl. ...................................... 99/358; 219/383; 219/521

[58] Field of Search .................. 99/358, 441; 219/383, 219/385, 521, 524, 525; 426/107, 234, 113, 244, 114, 246; 206/525, 527; 335/225, 258; 229/31

[56] References Cited

U.S. PATENT DOCUMENTS

| | | | |
|---|---|---|---|
| 2,274,325 | 2/1942 | Ford | 99/358 |
| 2,939,793 | 6/1960 | Richman | 99/358 |
| 3,062,663 | 11/1962 | Furgal | 219/385 |
| 3,230,861 | 1/1966 | Korr | 99/358 |
| 3,863,048 | 1/1975 | Buckley | 99/358 |
| 4,016,297 | 4/1977 | Theimer | 426/90 |
| 4,016,301 | 4/1977 | Theimer | 426/573 |

*Primary Examiner*—Stanley N. Gilreath
*Assistant Examiner*—Timothy F. Simone
*Attorney, Agent, or Firm*—Arthur L. Liberman; Richard S. Roberts

[57] ABSTRACT

Disclosure is an appliance for use in conjunction with the electrical resistance cooking of an electrically high conducting food substance within an electrode type cooking package which comprises: A housing defining a packaged food cooking compartment; and retractable plunging means located at opposite ends of said cooking compartment which urge intimate electrical contact between an electrically high conducting food substance held within a subject food containing package, said package being set within the food cooking compartment, and at least two electrical contacts located at the inside surfaces of diametrically opposite ends of said imparting a regulated electrical current for finite time periods to said electrical contacts, forcing current through a subject electrically high conducting food substance, cooking same by conversion of electrical energy into heat without undesirable arcing or food burning; and a protective cover which may exist in an open or closed position. When closed said cover seals the cooking compartment and closes the electrical circuit for added safety during operation. Functionally this invention is designed to enclose an electrode type cooking package, hold the therein contained electrically high conducting food substance in fixed intimate contact with at least two electrical contacts located within said cooking package and impart a regulated electrical current to the subject food substance for a determined time period, completely cooking same without arcing or burning the food.

3 Claims, 13 Drawing Figures

FIG.1
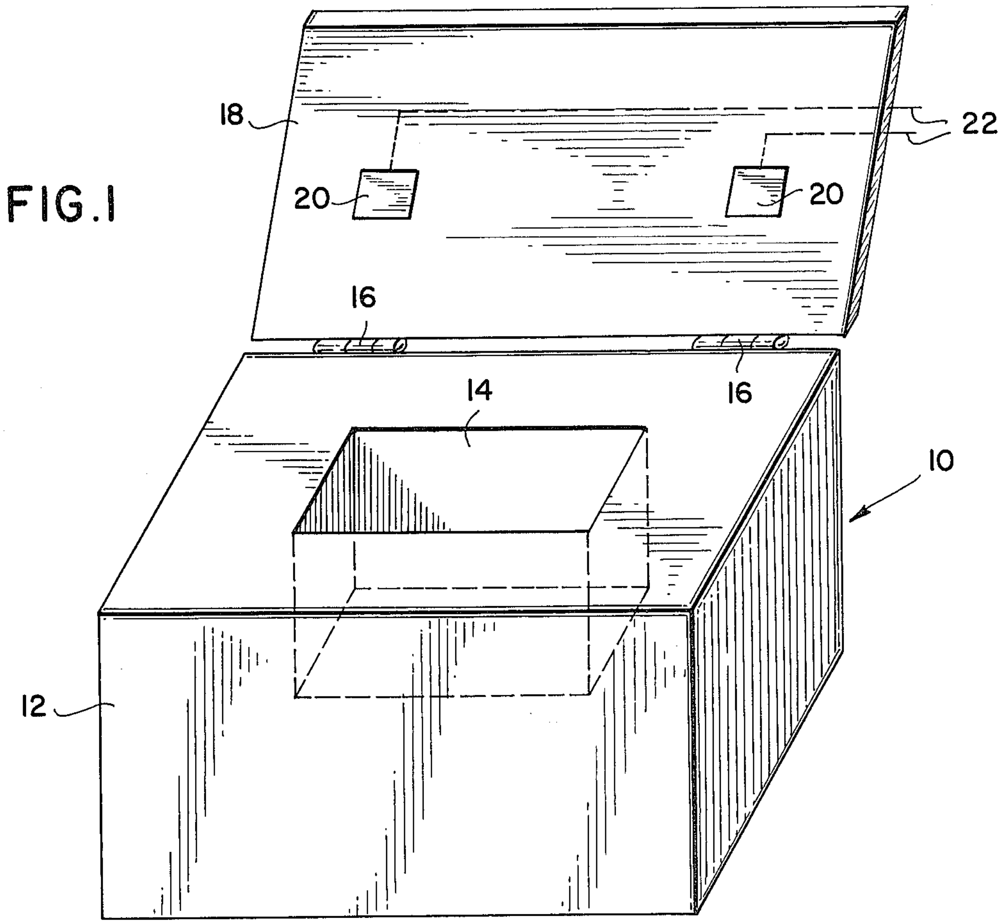
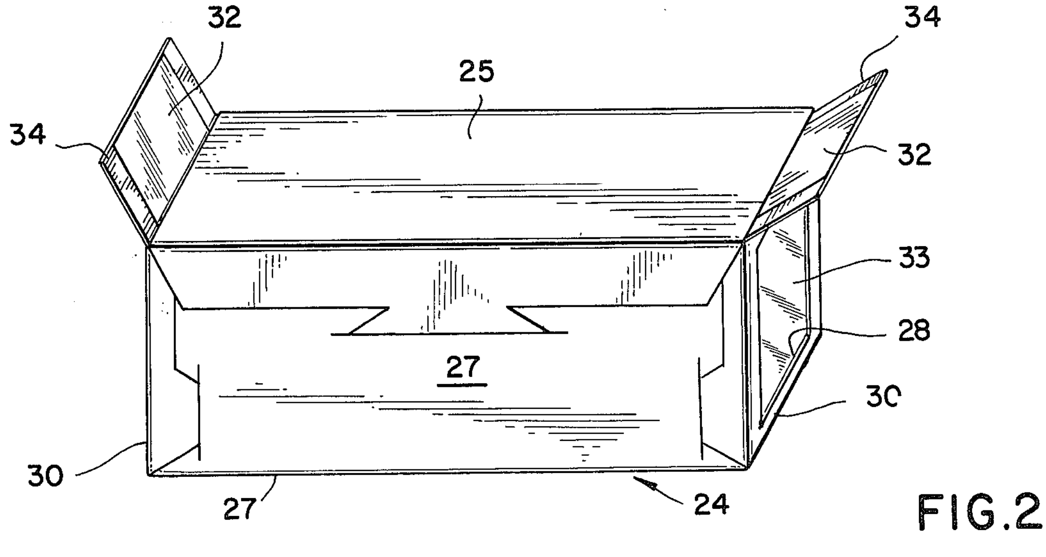
FIG.2

FIG.3
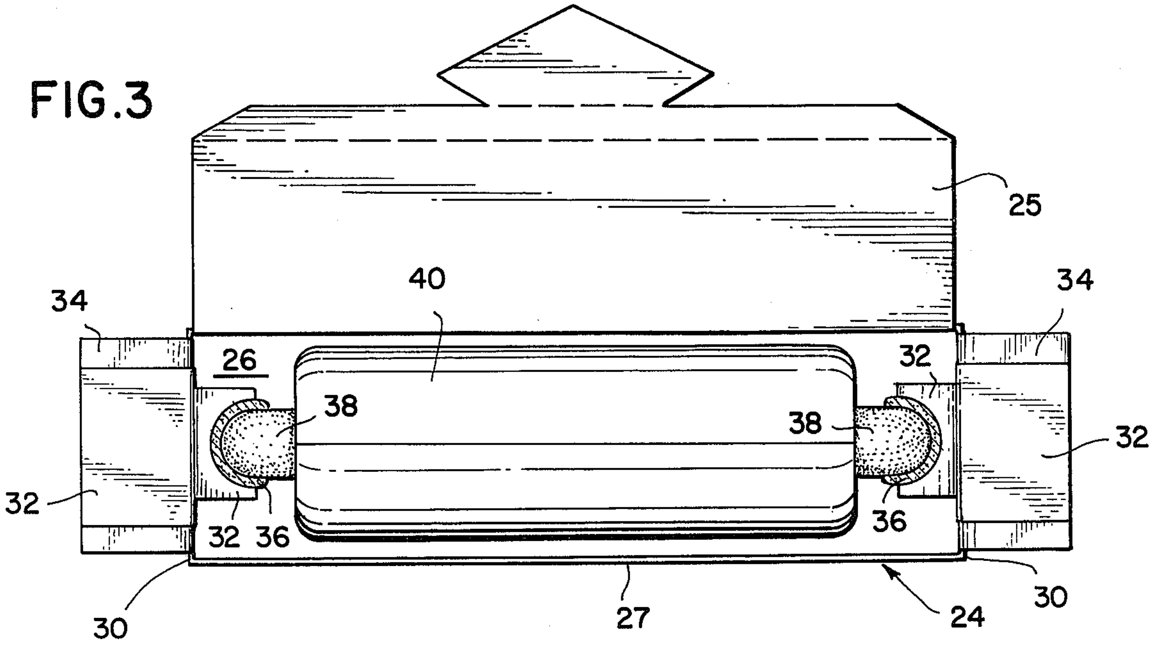
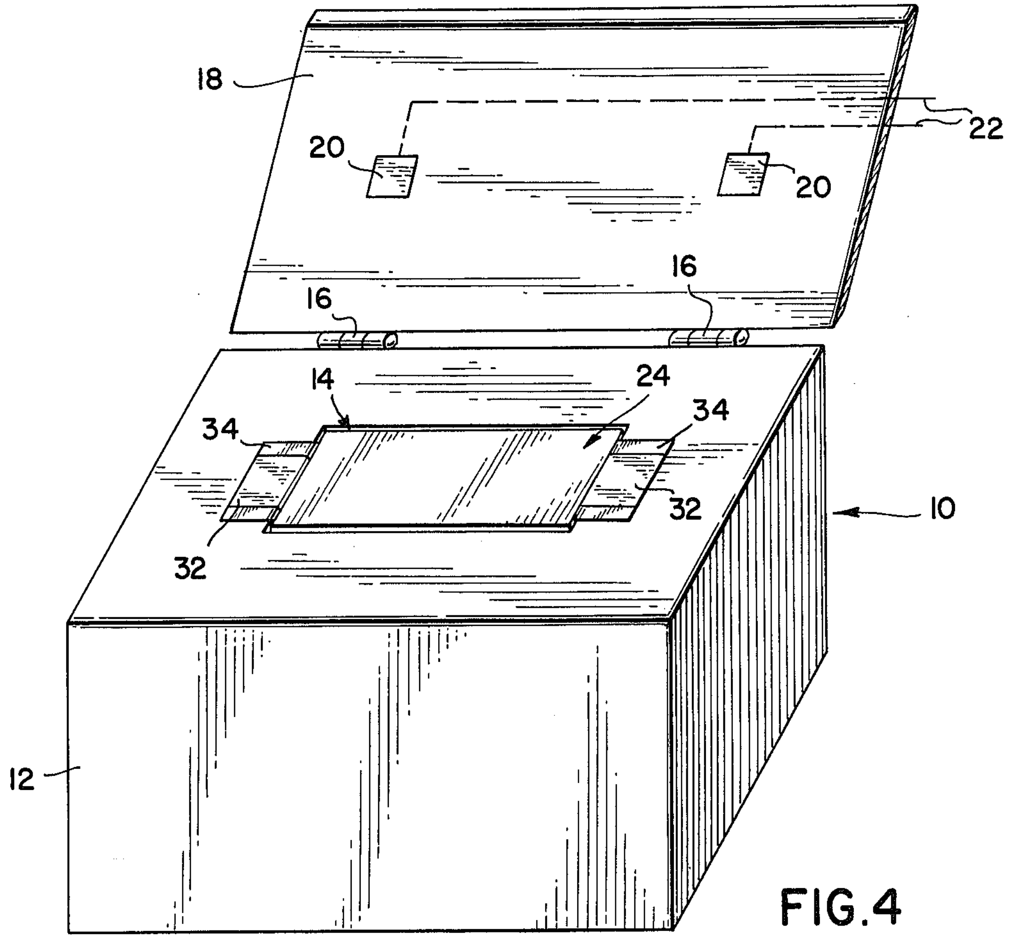
FIG.4

FIG. 12
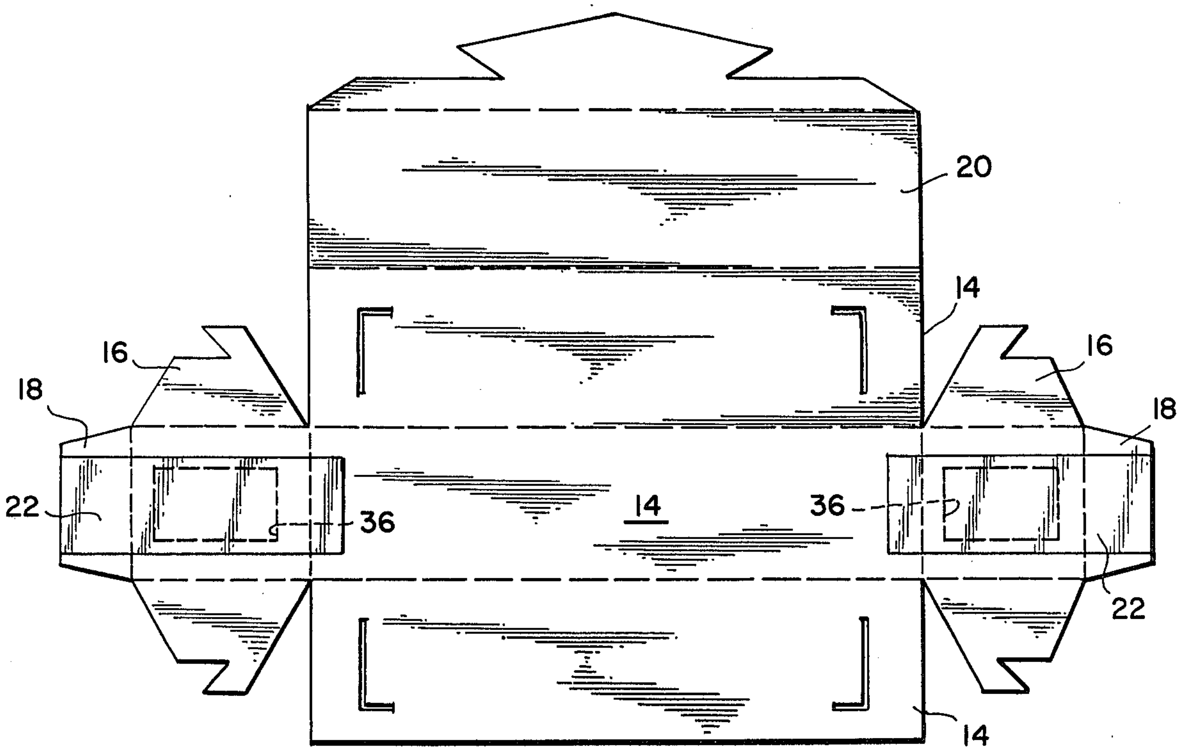
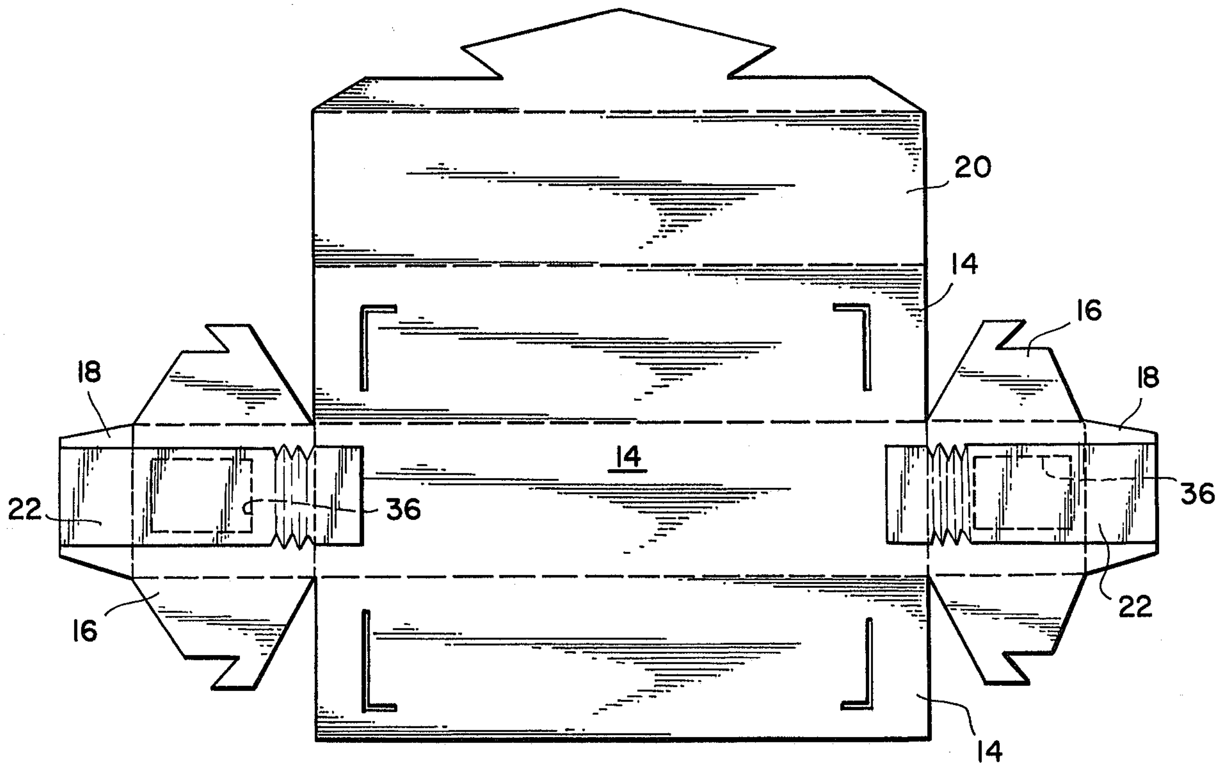
FIG. 13

ELECTRICAL RESISTANCE COOKING APPLIANCE FOR USE WITH AN ELECTRODE TYPE COOKING PACKAGE

BACKGROUND OF THE INVENTION

This invention relates to the art of electrical resistance cooking, more particularly to the electrical resistance cooking of an electrically high conducting food substance such as a frankfurter contained within a disposable, electrode type cooking package.

Electrical resistance cooking is well known in the prior art, however past disclosures possess several disadvantages which are overcome by the present invention. An essential requirement for this type of cooking is establishment and maintenance of a good electrical contact between the subject foodstuff and a set of electrical terminals while cooking. Previous inventions require that electrodes puncture or pierce the food, or that portions of the food be immersed in electrolytic baths in order for sufficient electrical current to flow for food cooking. Other disclosures require the food to be touched or exposed to outside contaminants for cooking to be effected.

The present invention eliminates these disadvantages and reveals an appliance whose operation is essentially dry with the subject food not touched nor exposed to outside contaminants prior to eating. This operation is therefore convenient for use as a home appliance, in food vending machines and in commercial uses such as fast food restaurants.

DESCRIPTION OF THE PRIOR ART

The electrical resistance cooking of an electrically high conducting food substance is well known in the art as described in the following United States patents:

U.S. Pat. No. 3,548,738 dated Dec. 22, 1970

Inventor: Mc Devitt and Hildebrand

Discloses: A hot dog vending machine comprising a refrigerated food storage compartment, a pair of vertically spaced actuating bars and a composite hot dog and electrode cooking package stored within the said food compartment, the said package containing a pair of spaced electrodes each intimately bonded to the hot dog and retained within a cylindrical cardboard container which has been preformed for cooperation with the spaced actuating bars.

U.S. Pat. No. 3,565,642 dated Feb. 23, 1971

Inventor: Hirsch

Discloses: A cooking appliance for food whereby the food is placed in a container between two electrolyte baths which are connected to a source of electrical potential by a pair of electrodes, preferably via a first and second resilient contact which is inserted into holes provided in the bottom of the container. The appliance is also preferable provided with a safety device for locking the lid during cooking, and the container is preferably removably mounted in a support base which contains the current supply conductors.

U.S. Pat. No. 2,306,573 dated Dec. 29, 1942

Inventor: Stern

Discloses: An electric cooking apparatus for frankfurters which comprises a base, a plurality of cups, absorbent pads disposed within each cup moistened with an electrolytic solution, and electrical terminals located in the bottom of each cup. In operation, a frankfurter is set so that each of its two end portions are positioned within distinct cups and bathed by said electrolytic solution when sufficient current is introduced to the provided terminals, the frankfurter is subsequently cooked.

The McDevitt and Hildebrand disclosure reveals a vending machine rather than an appliance as in this application, and is therefore not adaptable for household use. In addition, the inconvenient electrode caps must be removed prior to food consumption. Further, insufficient contact area between the foodstuff and the electrode caps tends to cause undesirable food charring.

Both the developments of Hirsch and Stern require immersion of the subject foodstuff in electrolytic baths prior to introduction of electric current. These innovations require the unhygienic handling of foods prior to eating and furthermore are not readily adaptable for use in food vending machines.

Other United States patents such as

Richman: U.S. Pat. No. 2,939,793

Roslonski: U.S. Pat. No. 3,651,752

Korr: U.S. Pat. No. 3,230,861

Korr: U.S. Pat. No. 3,245,338

Korr: U.S. Pat. No. 3,331,285 address themselves to cooking packages rather than appliances for electrical resistance cooking.

The following U.S. patents present appliances and methods for electrical resistance cooking, however, they require the undesirable impaling of the subject foodstuff to effect electrical continuity:

Simpkins: U.S. Pat. No. 2,390,277

Ford: U.S. Pat. No. 2,256,976

Steuber: U.S. Pat. No. 2,951,433

Everett: U.S. Pat. No. 3,117,511

Ford: U.S. Pat. No. 2,274,325

Watson: U.S. Pat. No. 2,200,405

McConnell, et al: U.S. Pat. No. 2,139,690

Aff: U.S. Pat. No. 2,474,390

Spiess: U.S. Pat. No. 2,642,794

The following U.S. patents also present appliances and methods for electrical resistance cooking, however, these require the ends of the subject foodstuff to be immersed in electrolytic baths to provide electrical continuity:

Sharpe: U.S. Pat. No. 2,405,984

Berkeley: U.S. Pat. No. 2,025,085

Richman, in U.S. Pat. No. 2,930,312 describes a vending machine mechanism whereby cooking is effected by use of a food heater.

Sierk, in U.S. Pat. No. 2,794,384 describes a vending machine incorporating electrical resistance, cooking, however, this invention requires the severing of burned portions of meat.

Lee, et al, in U.S. Pat. No. 3,167,431 describes an appliance used for cooking ground meats and is not useful with prepackaged food products such as frankfurters.

The present invention as hereinafter disclosed obviates the aforementioned disadvantages; is essentially dry in operation; does not require food handling prior to consumption; is useful as a household appliance, as part of a vending machine, or as a cooking device in a fast food restaurant. Further, is improves electrical contact area and regulates the amount of electricity required for proper cooking of various food types.

BRIEF DESCRIPTION OF THE DRAWINGS

FIG. 1 is a front perspective view of the electrical resistance cooking appliance of this application. This view, showing its external appearance displays a housing having a food cooking compartment, and a cover with attached electrical contacts used for imparting the energy required to cook the subject foodstuff.

FIG. 2 is a front perspective view of a food cooking container used in conjunction with the appliance of this disclosure. It comprises an electrically and preferably thermally insulating enclosure having apertures at each of its two most diametrically opposite ends; and an electrically high conducting film attached to the surface, preferably the inside surface of said most diametrically opposite ends, draping the apertures and extending out of the formed compartment by way of the provided end flaps. Use of the appliance and food container combination will be herinafter described in detail.

FIG. 3 is a plan view of a food cooking container with a subject electrically high conducting foodstuff set in place. The electrical conducting film is shown form fit to the ends of the electrically high conducting food substance as caused by use of the present invention. In intimate electrical contact with and positioned between the electrically high conducting food substance and the inside surface of said electrically conducting film is an edible composition which substantially improves electrical continuity consisting essentially of:

(i) a gel; and (ii) a substantially ionized species

This composition will be described in detail hereinafter.

FIG. 4 is a front perspective view of the electrical resistance cooking appliance of this application showing a food cooking container set in place within the food cooking compartment of the apparatus. To complete the required electrical circuit, the cover is closed and the shown electrical contacts join with the conducting films of the container.

Figure 5:
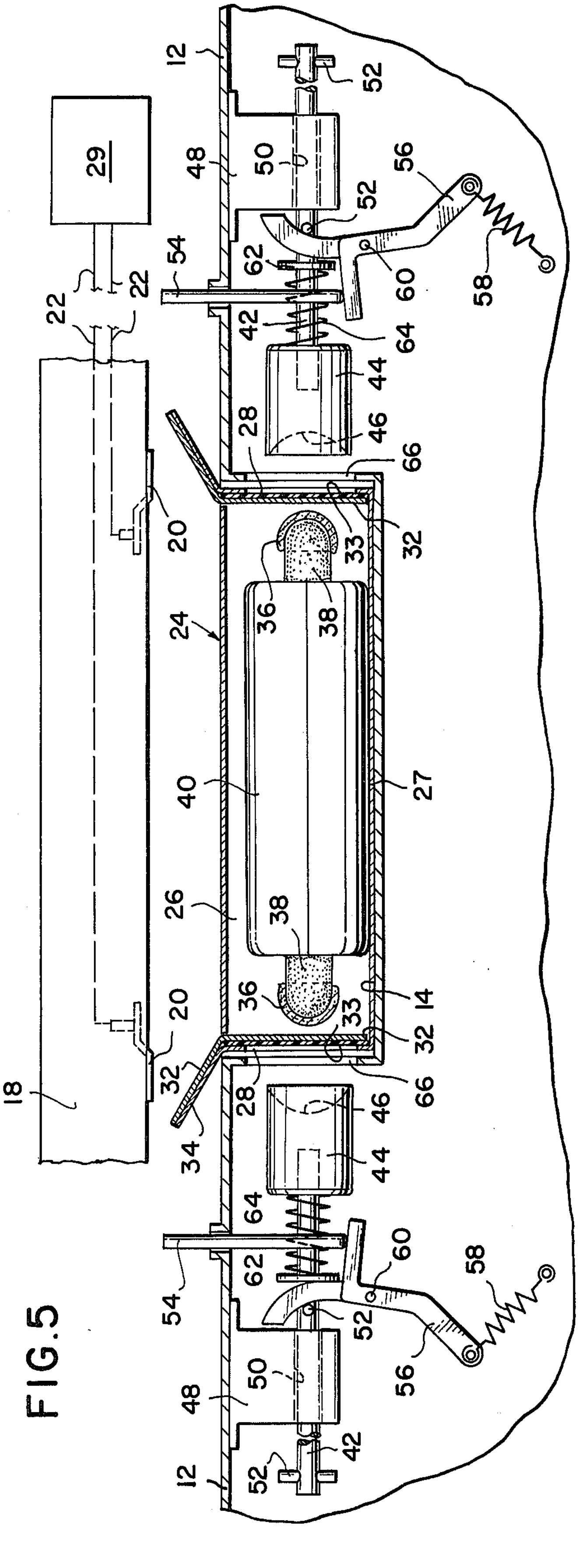

FIG. 5 is a front longitudinal cross section of the electrical resistance cooking appliance revealing a preferred embodiment of the retractable plunging means, which urge intimate electrical contact between a subject electrically high conducting food substance held within a food containing package and at least two electrical contacts located at the inside surfaces of diametrically opposite ends of said food containing package.

Figure 6:
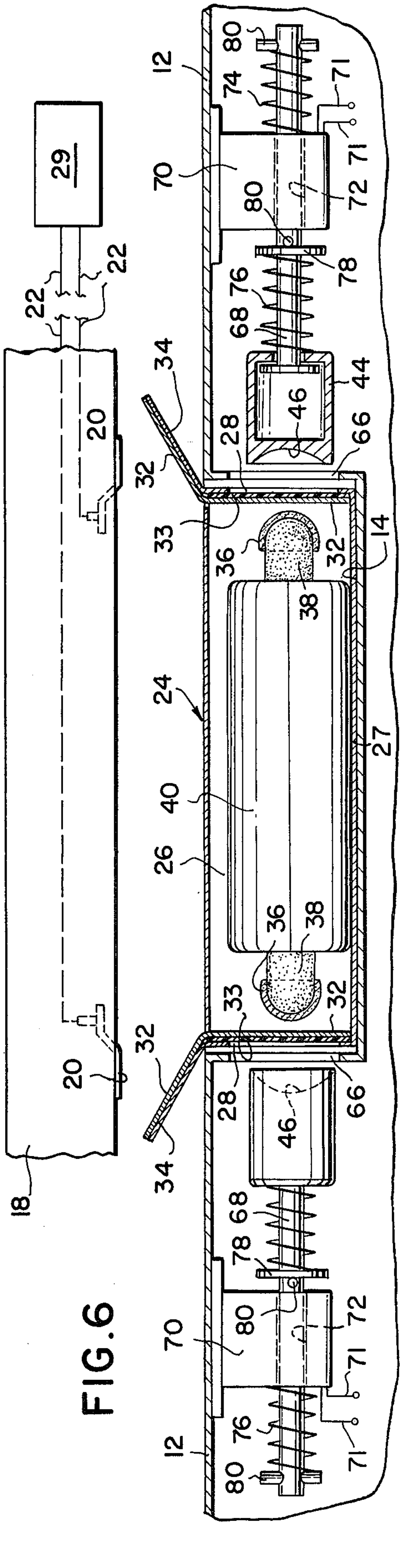

FIG. 6 is front longitudinal cross section of the aforementioned appliance showing an alternate configuration for the plunging means of FIG. 5. Here also a subject food substance and electrode type food container is shown set in place.

Figure 7:
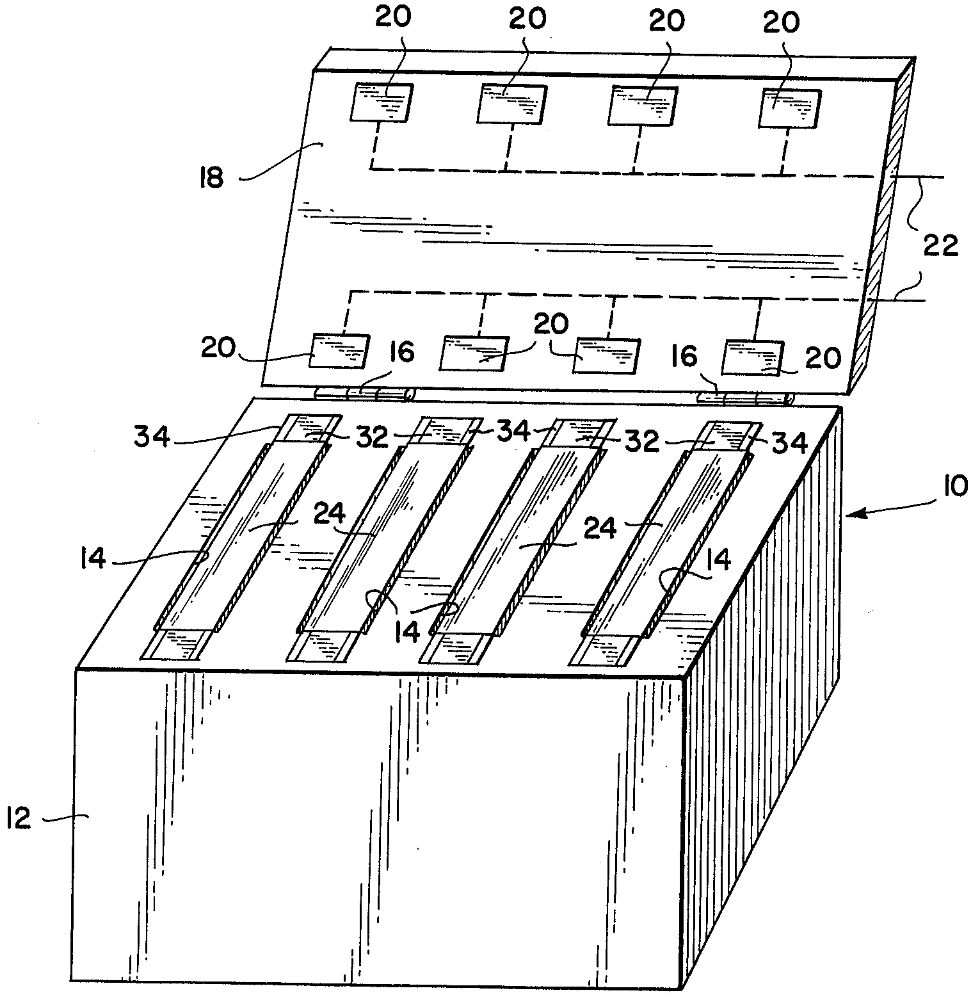

FIG. 7 is a front perspective of a typical electrical resistance cooking appliance of this application where a plurality of food units may be cooked simultaneously.

Figure 8:
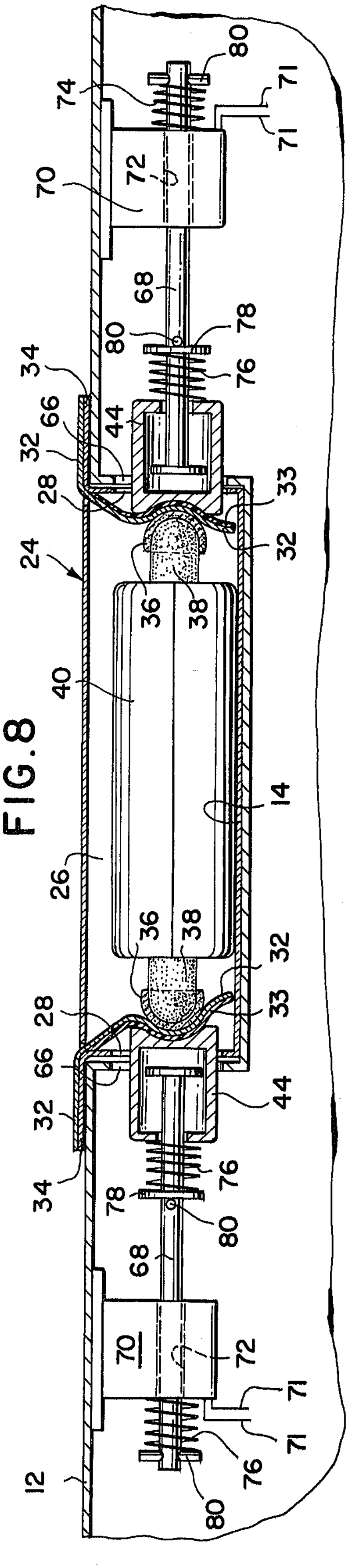

FIG. 8 is a front longitudinal cross section of the mechanism of FIG. 6 showing the plunging means pushing through the container apertures urging the electrodes into a form fit around the electrically high conducting food through the medium of the gel and substantially ionized species.

Figure 9:
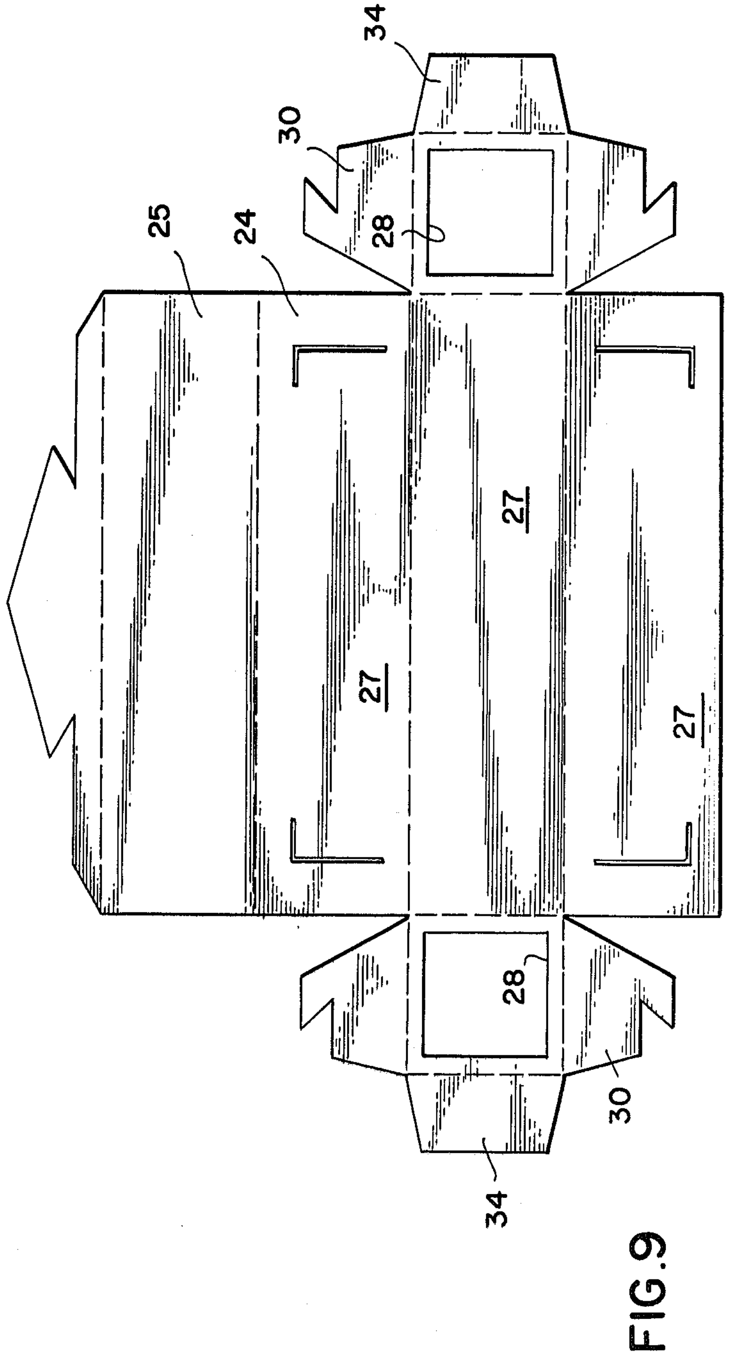

FIG. 9 is a blank which when properly assembled forms the container used with this invention, shown here prior to application of the electrical contacts and optional flexible film.

Figure 10:
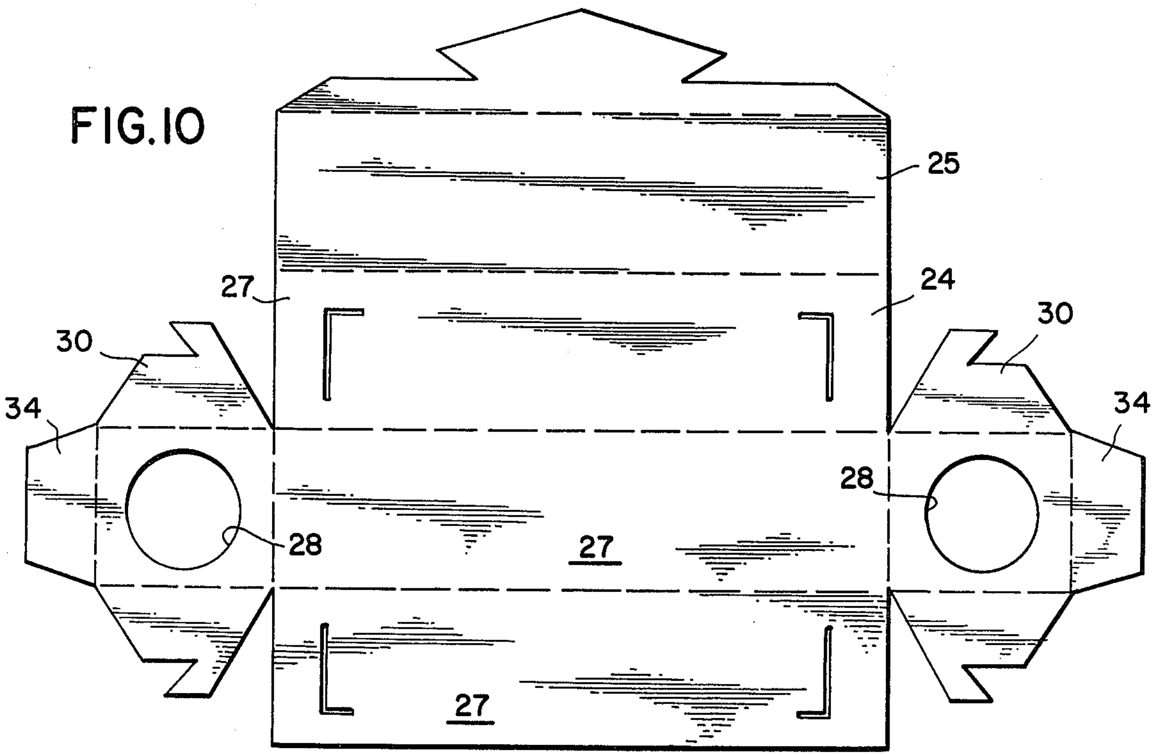

FIG. 10 is a blank similar to FIG. 9 except the end panel apertures are circular.

Figure 11:
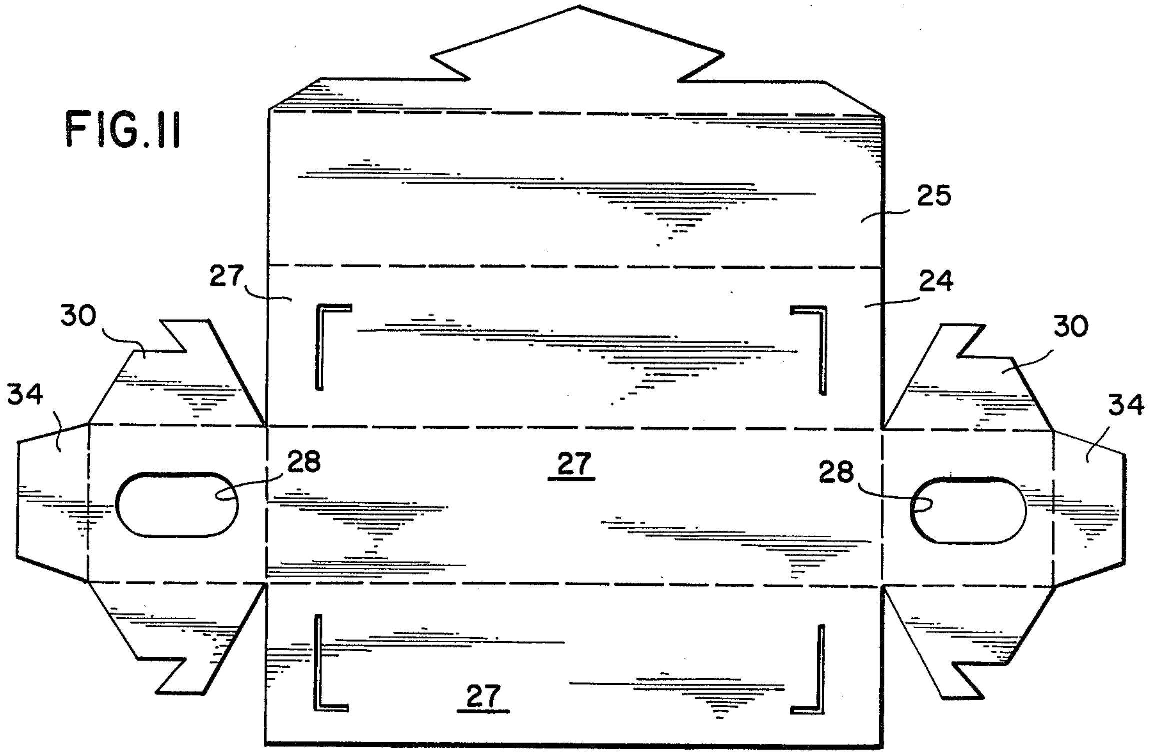

FIG. 11 is a blank similar to FIG. 9 except the end panel apertures are oval.

FIG. 12 is a blank similar to FIG. 9 additionally showing attached foil electrodes.

FIG. 13 is a blank similar to FIG. 9 where the end foils are pleated to preclude tearing when form fit to the subject food.

SUMMARY OF THE INVENTION

The most significant problems with all previous attempts to apply the techniques of electrical resistance cooking have been the serious disadvantage in practicability arising from the methods used to establish the necessary integrity of electrical contact between a subject electrically high conducting food substance and a set of provided electrodes, and consequently an adequate flow of electrical current therethrough. Virtually all previous disclosures require either physical piercing of the subject foodstuff by the electrodes or bathing opposite portions of the food substance in electrode embracing electrolytic baths.

The first previous proposal is conducive to an unsanitary condition if electrodes are not cleaned often, and the second requires the unhygienic requirement of food manipulation. In both situations foods are often not thoroughly cooked and are subject to spot burning, resulting in an unpalatable product.

The purpose of this invention is to disclose an apparatus for cooking by electrical resistance means an electrically high conducting food substance held within an electrode type cooking package without the abovementioned problems, specifically, without burning, arcing, incomplete cooking, food piercing or use of electrolytic baths.

The present invention solves the aforementioned difficulties and is designed specifically for the electrical resistance cooking of an electrically high conducting food substance held within an electrode type cooking package.

The invention comprises:

(a) A housing which defines a packaged food cooking compartment; and (b) Retractable plunging means located at opposite ends of said cooking compartment which urge intimate electrical contact between an electrically high conducting food substance held within a subject food containing package, said package set within the food cooking compartment, and at least two electrical contacts located at the inside surfaces of diametrically opposite ends of said food containing package; and (c) Means for imparting a regulated electrical current for finite time periods to said electrical contacts, forcing current through a subject electrically high conducting food substance, cooking same by conversion of electrical energy into heat without undesirable arcing or food burning; and (d) A protective cover which may exist in open or closed position, said cover capable of closing the cooking compartment thereby completing the electrical circuit for added safety during operation.

Functionally this invention is designed to enclosed an electrode type cooking package, hold the therein contained electrically high conducting food substance in a fixed intimate contact with at least two electrical contacts located within said cooking package and imparting a regulated electrical current through the electrical contacts to the subject food substance for a determined time period, completely cooking the food without arcing or burning.

This invention is more particularly designed for use with an electrode type food container which comprises:

(a) An electrically and preferably thermally insulating container which defines a food cavity having a substantially uniform longitudinal cross sectional area, and an aperture in each of its two most diametrically opposite ends; and (b) Electrical contacts located at said diametrically opposite ends attached preferably to the inside surface of said container ends while draping the apertures and extending out of the container to a source of electrical energy; and (c) A composition in intimate contact with the inner surfaces of said electrical contacts and the subject foodstuff consisting essentially of:

(i) a gel; and (ii) a substantially ionized species

The composition which is to be in intimate contact with both the surface of the food substance and at the same time with the electrical contacts, consists essentially of:

(i) An aqueous gel selected from the group consisting of agar, xanthan gum, tragacanth, guar gum, gum arabic and algin gum, in water; and (ii) A substantially ionized species selected from the group consisting of sodium chloride, potassium chloride, ammonium chloride, magnesium chloride sodium glutamate, potassium glutamate, sodium alginate, potassium alginate, ammonium alginate, magnesium alginate, calcium alginate, sodium bicarbonate, potassium bicarbonate, magnesium bicarbonate, calcium bicarbonate.

The aforementioned plunging means are essentially comprised of a pair of pushrods, each having a food form fitting plunger fixedly attached to one end thereof. Located at the opposite ends of said pushrods are means for moving said plungers toward and away from subject electrically high conducting food substance disposed in an electrode type food container as previously described which is set in the provided food cooking compartment. The plungers advanced through the apertures in the food container and hold the inside surfaces of the container electrodes in intimate form fitting contact with the subject food substance without tearing said surfaces. The gel holding the ionized species composition, makes this area of contact completely continuous. Said plunging means assure proper electrical contact, and adjustably hold the subject food substance in proper position for the entire duration of the cooking process.

Electrical current regulating means are provided within the furnished electrical circuit to impart a continuous stream of energy in the proper amount for the required period of time to cook the particular foodstuff. The resulting food substance is completely cooked without arcing or food burning.

Upon completion of the cooking cycle the plunging means are retracted, the cooking package is removed and the food located in said package is available for consumption.

A container, as described for the purposes of our invention, is fabricated of an electrically and preferably thermally insulating material such as cardboard, or alternatively a rigid polymer, such as polyvinyl chloride or polyvinyl acetate polyvinyl chloride copolymer, or an aerated polymer such as polystrene or polyurethane in order to provide a light, disposable package suitable for use in vending machines and for large scale vending operations where it is desirable to cook rapidly large quantities of units and keep them reasonably warm for relatively long periods of time subsequent to cooking. Examples of such vending machines are set forth in U.S. Pat. No. 3,651,752 issued on Mar. 28, 1972. In particular, such a container, shell or enclosure would be operable whereby when an electrical current in the initial range of 1.0 to 10.0 amperes and from 100 up to 500 volts is applied for a period of time from 3 up to 20 seconds to an electrical conducting means, the food product within the container (e.g. a frankfurter of $\frac{5}{8}$ to $\frac{7}{8}$ inch in diameter and 4.5 to 6 inches long) being cooked internally so that the average temperature of the electrically conducting food (such as a frankfurter) after cooking, is initially in the range from 140° to 212° F and the average temperature range of the accompanying low conducting food (e.g. a frankfurter roll, hamburger bun or pizza dough) is, after cooking, initially in the range of 100° to 160° F; and after about 50 minutes subsequent to cooking the average temperature of the high conducting food is in the range of from 100° to 150° F and the average temperature of the low conducting food is from 90° to 130° F.

The container described herein accomplishes this, and in addition, obviates the need to expose fresh portions of the electrically conducting food (as, for example, by cutting or peeling the ends of a frankfurter) thereby (1) maintaining proper hygienic standards; (2) simplifying the packaging and (3) improving the accessibility of the food to the consumer.

A typical cardboard container for use with this invention may be erected by appropriately folding and interlocking the sides of a blank such as that illustrated in FIG. 9.

The sides of said blank have substantially coterminous edges which articulate one another in such a manner as to form the required container and food cavity. The completed container is capable of existing in a closed position and an open position. Aluminum foil electrodes or metalized surfaces are then suitably attached so as to drape the apertures in the most diametrically opposed ends of the container.

The electrical contacts extend outwardly from said container, said electrical contacts having electrically conducting ends external to said container, said ends being designed to make electrical contact with an electrical energy source when said container is in a closed position.

Metallizing as mentioned above can be effected according to any of the processes set forth in U.S. Pat. Nos. 3,533,828; 3,549,505; or 3,669,714. The container of this application is preferably from 4 to 12 inches in length, 1 to 4 inches in height and 1 to 4 inches in depth although larger or smaller sizes do not depart from the scope of this invention. The appliance housing of this application is preferably from 12 to 30 inches in length, from 6 to 15 inches in height and from 6 to 15 inches in depth although larger or smaller sizes do not depart from the scope of this invention. Heating of the non-conducting food is dependent upon heat conduction into it by means of the mass transfer of hot water vapor diffusing from the conducting food into the non-conducting food as and after the conducting food is heated and/or by heat transfer per se. The operable and workable thickness range of the walls of the container used in conjunction with our invention is from 0.01 inches up to 1 inch with 3/32–$\frac{1}{4}$ inch preferred in the case of a foamed polymer such as styrofoam and from 0.005 up to 0.1 inch preferred in the case of cardboard or a rigid polymer such as a polyvinyl acetate-polyvinyl chloride copolymer, for ease in handling and for optimal thermal performance. The thermal conductivity of the materials of construction of the container should be less than 1.50 BTU/hour-sq. ft. - (° F/inch). A practical thermal conductivity range when using a foamed polymer is from 0.15 up to 0.50 BTU/hour-sq. ft. - (° F/inch).

The more preferable range of thermal conductivity of the foamed polymer-type materials of construction of the container of our invention is from 0.20 – 0.30 BTU/-hour-sq.ft.-(° F.inch) at a mean temperature of between 60° F and 100° F. Thus, for example, a convenient and workable polystyrene foam for use as a material of construction may have at mean temperature of 75° F the following thermal conductivity coefficients:

| Density | K(BTU/hour-ft$^2$-(° F/inch) |
|---|---|
| 1 lb/ft$^3$ | 0.26 |
| 1.5 lb/ft$^3$ | 0.25 |
| 2 lb/ft$^3$ | 2.24 |

A practical thermal conductivity range when using a thin wall (0.01–0.1 inch thickness) rigid polymer such as a polyvinyl chloride-polyvinyl acetate copolymer is from 1.0 up to 1.4 BTU/hour-sq.ft.-(° F/inch).

It is therefore an object of the present invention to provide an appliance used for the electrical resistance cooking of one or more units of an electrically high conducting food which is alternatively useful as a household appliance, a cooking instrument in a fast food restaurant in conjunction with a large scale catering service, or as the cooking element of a food vending machine.

It is also an object of the present invention to provide an appliance used for the electrical resistance cooking of one or more units of an electrically high conducting food which is easy to operate, and is inexpensive to manufacture.

It is another object of the invention to provide an appliance used for the electrical resistance cooking of one or more units of an electrically high conducting food which is fast cooking, conserves energy and improves accessibility of food to the consumer.

It is a further object of the invention to provide an appliance used for the electrical resistance cooking of one or more units of an electrically high conducting food which assures intimate electrical continuity without food piercing.

It is still another object of the invention to provide an appliance used for the electrical resistance cooking of one or more units of an electrically high conducting food which positions properly with respect to the electrodes and holds the food in place for the entire cooking cycle.

It is a still further object of the invention to provide an appliance used for the electrical resistance cooking of one or more units of an electrically high conducting food which safely imparts to the food substance a regulated electric current in an amount sufficient for thorough cooking.

It is also an object of the present invention to provide an appliance used for the electrical resistance cooking of one or more units of an electrically high conducting food substance which does not require food handling or other manipulation prior to consumption.

Another object of the invention is to provide an appliance used for the electrical resistance cooking of one or more units of an electrically high conducting food substance which completely cooks the subject units of food substance without undesirable arcing or burning.

These and other objects of the invention will become apparent upon consideration of the detailed description of the preferred embodiment.

DETAILED DESCRIPTION OF THE PREFERRED EMBODIMENT

Referring to the drawings, FIG. 1 shows the appliance 10 of this disclosure to comprise an electrically and preferably thermally insulating housing 12 which defines a hollow food cooking compartment 14. Fixedly attached to the upper portion of said housing are one or more hinges 16 which movably support protective cover 18. Mounted on the inside surface of said cover are a plurality of electric terminals 20 which receive a supply of electric current through leads 22. The housing and protective cover are preferably constructed of a rigid insulating material such as wood, polyurethane or any other suitable material with similar properties. Electric terminals 20 and leads 22 may be composed of any suitable conductor of electricity such as copper or aluminum.

FIGS. 2 and 3 show an electrode type cooking package 24 which is designed to be set within the food cooking compartment 14 of this appliance. This cooking package is described in application for U.S. Letters Patent Ser. No. 747,307, filed Dec. 3, 1976 filed on even date herewith. FIG. 4 illustrates the cooking package positioned within the appliance of this invention. This cooking package comprises:

(a) An electrically and preferably thermally insulating container 24 which defines a food cavity 26 as shown in FIG. 3 having a substantially uniform longitudinal cross sectional area, and an aperture 28 in each of its two most diametrically opposite ends 30 as shown in FIG. 2 and;

(b) Electrical contacts 32 located at said diametrically opposite ends attached to the surface, preferably the inside surface of the said container ends 30, while draping the apertures 28 as shown in FIG. 2 and extending out of the container by way of flaps 34 to a source of electrical energy from electric terminals 20 of FIG. 4.

(c) A composition 36 as shown in FIG. 3 in intimate contact with the inner surfaces of said electrical contacts and the subject foodstuff 38 consisting essentially of:

(i) a gel; and (ii) a substantially ionized species

As a particular embodiment of a thin plastic film 33 of FIG. 2 such as polyvinyl chloride, polyethylene, polypropylene, or cellulose acetate may be positioned between the electrical contacts 32 and the container end panels 30 draping the apertures 28 in order to provide additional strength and integrity to the package.

The composition 36 shown in FIG. 3 which is to be in intimate contact with both the surface of the food substance 38 and at the same time with the electrical contacts 32, consists essentially of;

(i) An aqueous gel selected from the group consisting of agar, xanthan gum, tragacanth, guar gum, gum arabic and align gum, in water; and (ii) a substantially ionized species selected from the group consisting of sodium chloride, potassium chloride, ammonium chloride, magnesium chloride, sodium glutamate, potassium glutamate, sodium alginate, potassium alginate, ammonium alginate, magnesium alginate, calcium alginate, sodium bicarbonate, potassium bicarbonate, magnesium bicarbonate, calcium bicarbonate, wherein;

(i) The weight percent of water is initially 86 to 99.33

(ii) The weight percent of gel is initially 0.5 to 4.0

(iii) The weight percent of edible ionized species is initially from 0.2 to 10.0

The composition 36 of FIG. 3 may be coated onto an electrically high conducting food substance 38 where the electrical contacts 32 are to meet the electrically high conducting food substance 38. Alternatively the composition 36 useful for practicing our invention may be coated both onto the electrical contact 32 and onto the electrically high conducting food substance 38 where the electrical contact 32 is in intimate non-arcing contact with the electrically high conducting food substance 38.

The container 24 and gel with ionized species 36 of FIG. 3 is useful in forming a food package comprising an electrically low conducting food substance such as a frankfurter bun 40 and an electrically high conducting food substance such as a frankfurter 38 disposed in proximate contact with the low conducting food substance 40, said electrically high conducting food 38 having an an electrical resistivity of from 1 up to 50 ohm inches over a temperature range of from 30° up to 250° F and having substantially diametrically opposite ends, with substantially solid surfaces.

At least two electrical contacts 32 as shown in FIG. 3 are located at the substantially diametrically opposite ends of the electrically high conducting food substance 38 in intimate non-arcing contact with the electrically high conducting food substance 38 such that an electrical current can pass from the contact 32 to the electrically high conducting food substance 38 without undergoing a high voltage drop. The composition 36, as stated above, comprising a gel and edible ionized species is positioned to make intimate non-arcing contact between the electrically high conducting food substance 38 and the two electrical contacts 32.

The container 24 of FIG. 2 is constructed of a plurality of sections 25, 27 and 30 having substantially co-terminous or interlocking edges articulating one another. The electrical conducting means 32 such as strips of aluminum foil having a thickness of approximately 0.1 to 0.6 mils (0.1 to 0.6 $\times 10^{-4}$ inches) extend outwardly from the container upon its end flaps 34. The electrical conducting means 32 are designed to make electrical contact with the terminals 20 of FIG. 4 of the electrical energy source when the container is in a closed position.

In intimate contact with at least two unconnected portions (having a substantial degree of separation therebetween) of at least one of the external surfaces of the high conducting food 38 are:

1. An electrically high conducting composition 36 consisting essentially of a gel and an edible ionized species; and 2. At least two electrical contacts 32.

The preferred ratio of the surface area of the contacted electrically high conducting food substance (that is, contacted with an electrical contact) to the surface area of non-contacted high conducting food substance is from 1:100 up to 1:10 with the most preferred ratio being frm 1:50 up to 1:25. The gel-ionized species composition is applied in an amount to at least fill completely the entire area of electrical contact when the container is in operative position. The electrically high conducting food may also be thermally high conducting.

FIG. 5 describes one species of the internal operating mechanism of this disclosure. It is shown to comprise:

(a) A pair of pushrods 42 each having a solid, substantially cylindrical plunger 44 fixedly attached to one end thereof, said plunger having a hemispherically concave food form fitting depression 46 in its opposite end; and (b) A pair of guideblocks 48 each having one of said pushrods 42 slidably mounted in a tubular cavity 50 therethrough, said guideblocks being fixedly mounted to the inside portion of the appliance housing 10 in such a manner as to allow said plungers 44 ingress to and egress from the food cooking compartment 14 of the appliance through openings 66 in the ends of said food cooking compartment 14. Said guideblocks support and limit the motion of said pushrods 42 to translation through said tubular cavities 50; and (c) A pair of stop pins 52 integral with each pushrod 42 on alternate sides of guideblock 48 limiting the travel distance of the pushrod to desired points; and (d) A pair of cover plungers 54 each, which when depressed, engage a cam 56, overcoming the force of a retraction spring 58 causing said cam to rotate about its pivot 60, forcing a slide washer 62 and pressure spring 64 which encircle the pushrod 42 between the food plunger 44 and stop pin 52, to urge the pushrod and food plunger toward the food cavity; and (d) One unit comprising components a, b, c and d for each food unit being cooked.

When activated, the food plunger 44 of FIG. 5 enters the food cooking compartment 14 through opening 66 in the walls thereof, penetrates the electrode type cooking package 24 through the provided film draped end apertures 28 as shown in FIG. 5 and urges the inside surface of the package electrodes 32 into intimate form fitting electrical contact with the subject electrically high conducting food substance 38 thus producing an area of continuous contact through the medium of the aforementioned composition 36 comprising:

(a) a gel; and (b) a substantially ionized species

An alternate species for the internal operating mechanism of this disclosure is shown in FIG. 6. It comprises:

(a) A pair of metallic pushrods 68 each having an electrically insulating, substantially cylindrical plunger 44 fixedly attached to one end thereof, said plunger having a hemispherically concave food form fitting depression in its opposite end 46; and (b) A pair of electrical solenoid guide blocks 70 each having one of said pushrods 68 slidably mounted in a tubular cavity 72 therethrough fixedly attached to the inside portion of the appliance housing 10 in such a manner as to allow said plunger 44 ingress to and egress from the food cooking compartment 14 through openings 66 in the sides of said food cooking compartment. Said electrical solenoid guide block 70:

(i) Supports and limits the motion of said pushrod 68 to translation through said tubular cavity 72; and (ii) Is constructed in such a matter that when the solenoid 70 is energized by means of electrical leads 71, a magnetic force is developed sufficient to overcome the force of a retraction spring 74, a pressure spring 76 and a slidewasher 78 which encircle the pushrod 68 and drive and hold the therein slidably contained metallic pushrod 68 towards the food cavity 14. The provided springs 74 and 76 automatically adjust for variances in food length during the cooking cycle as well as for different types of foods.

(c) A plurality of stop pins 80 integral with each pushrod 68 on alternate sides of the solenoid/guide block 70 which limit the travel distance of the pushrod to desired points.

(d) One unit comprising components a, b and c for each food unit being cooked.

Electrical energy from source 29 in FIGS. 5 and 6 is delivered to the appliance by means of electrical contacts 20 set on the inside surface of the protective cover 18. When the cover is closed, the electrical contacts 20 touch the metal electrodes of the food package 32 thus completing the required electrical circuit. A regulated amount of electrical energy from source 29 in FIGS. 5 and 6 is then introduced to bring the food to the desired temperature. Said regulating means is well known to the art and not a point of novelty here.

The following discussion illustrates the preferred method of practicing this invention.

In FIG. 5 an electrically high conducting foodstuff such as a frankfurter 38 is disposed within an electrically low conducting foodstuff such as a bun 40. The ends of the frankfurter 38 are coated with the gel and ionized species composition 36 and the coated frankfurter 38 is then positioned within the food cavity 26 of the previously described container 24 in proximity to aluminum foil electrodes 32 which are suitably attached to the inside surfaces of the end panels of the container 30 of FIG. 5, draped also by a protective plastic film 33 over the apertures 28 and extending out of the container by way of the shown end flaps 34. The lid of the container 25 is then closed with the end flaps 34 and electrical contacts 32 positioned outside the food cavity 26 as shown in FIGS. 2 and 3. The entire food package is then placed within the food cooking compartment 14 of the present invention. Plunging means as shown in FIGS. 5 and 6 are subsequently applied as previously described to the food package 24 through the end apertures 28 of the container 24 of FIG. 2 urging the inside surface of the electrical contacts 32 to an intimate form fitting contact with the ends of the frankfurter 38 through the medium of the gel and ionized specied composition 36. This system assures that no edge of an electrical contact touches the frankfurter, thus eliminating the danger of burning at such a point. Proper electrical contact is achieved by closing the protective cover 18. When said cover 18 is closed, the electrical contacts 20 thereon contact the electrodes 32 contained on the food package 24, completing the required circuit.

A regulated electric current from source 29 is then imparted to the completed circuit, cooking the subject foodstuff without arcing or burning. Upon completion of the cooking cycle, the cover is raised, the plunging means are retracted and the food made available for consumption.

FIG. 7 shows a typical appliance where a plurality of food units may be cooked simultaneously.

FIG. 8 shows the second preferred embodiment of the plunging means of this invention in a form fit configuration with the aforementioned packaged food product. It is shown to have entered the electrode type cooking package 24 and pressed electrode foil 32 into an intimate form fitting contact with the electrically high conducting food 38 through the medium of the composition 36 consisting essentially of a gel and substantially ionized species. Also shown is the thin plastic film 33.

FIGS. 9 through 13 respectively show alternate constructions of blanks which when appropriately folded and erected form the container useful for practicing the invention.

It is understood that the herein disclosed preferred embodiments are described for the purpose of illustration only and are not intended to limit the scope of this invention. Changes in materials, configuration or operating conditions of this invention are possible by those skilled in the art without departing from the nature and intent of this disclosure.

What is claimed is:

1. An appliance for use in the electrical resistance cooking of an electrically high conducting food substance within an electrode type cooking package which comprises:

(a) A housing defining a packaged food cooking compartment; and (b) Retractable plunging means including biasing means located inside said housing at opposite ends of said cooking compartment which urge intimate electrical contact between an electrically high conducting food substance held within a subject food package which is set within the food compartment and at least two electrical contacts located at the inside surfaces of diametrically opposite ends of said food containing package thus forming contacted ends; and (c) Means for imparting a regulated electrical current for finite time periods to said electrical contacts, forcing current through a subject electrically high conducting food substance, cooking same by conversion of electrical energy into heat without undesirable arcing or food burning; and (d) A protective cover which may exist in an open or closed position; said cover closes the cooking compartment and simultaneously closes the electrical circuit for added safety during operation, wherein the electrode type cooking package comprises:

(a) An electrically and preferably thermally insulating container which defines a food cavity having a substantially uniform longitudinal area, and an aperture in each of its two most diametrically opposite ends; and (b) Electrical contacts located at said diametrically opposite ends attached to the inside surface of said container ends, while draping the apertures and extending out of the container by way of flaps to a source of electrical energy; and (c) A composition in intimate contact with the inner surfaces of said electrical contacts and the subject foodstuff consisting essentially of:

(i) An aqueous gel selected from the group consisting of agar, xanthan, gum, tragacanth, guar gum, gum arabic and algin gum, in water; and (ii) A substantially ionized species selected from the group consisting of sodium chloride, potassium chloride, ammonium chloride, magnesium chloride, sodium glutamate, potassium glutamate, sodium alginate, potassium alginate, ammonium alginate, magnesium alginate, calcium alginate, sodium bicarbonate, potassium bicarbonate, magnesium bicarbonate, calcium bicarbonate wherein:

(i) The weight percent of water is initially 86 up to 99.3

(ii) The weight percent of gel is initially 0.5 to 4.0; and (iii) The weight percent of edible ionized species is initially from 0.2 up to 10.0 whereby continuous intimate contact during the entire cooking process takes place between the metal electrode and the meat in order to prevent burning, said plunging means causing said contacted end to follow the change in shape of the meat during cooking, and said biasing means causing said plunging means to follow said change in shape of said meat during cooking.

2. The appliance of claim 1 wherein the cooking package, a thin flexible plastic film is positioned between the electrical contacts and the container end panels, draping the apertures, whereby additional strength and integrity is provided to the package.

3. The appliance of claim 2 wherein in the cooking package the thin flexible plastic film is made from material selected from a group consisting of polyethylene, polypropylene, polyvinyl chloride and cellulose acetate.

* * * * *